(12) United States Patent
Woo et al.

(10) Patent No.: US 10,437,055 B2
(45) Date of Patent: Oct. 8, 2019

(54) MASTER DEVICE, SLAVE DEVICE, AND CONTROL METHOD THEREFOR

(71) Applicant: SAMSUNG ELECTRONICS CO., LTD., Suwon-si (KR)

(72) Inventors: Ji-Hwan Woo, Seoul (KR); Do-wan Kim, Suwon-si (KR); Han-il Yu, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 133 days.

(21) Appl. No.: 15/542,002

(22) PCT Filed: Dec. 3, 2015

(86) PCT No.: PCT/KR2015/013129
§ 371 (c)(1),
(2) Date: Jul. 6, 2017

(87) PCT Pub. No.: WO2016/111470
PCT Pub. Date: Jul. 14, 2016

(65) Prior Publication Data
US 2018/0003969 A1     Jan. 4, 2018

(30) Foreign Application Priority Data
Jan. 7, 2015   (KR) ........................ 10-2015-0001789

(51) Int. Cl.
*G02B 27/01*  (2006.01)
*G06T 19/00*  (2011.01)
(Continued)

(52) U.S. Cl.
CPC .......... *G02B 27/0101* (2013.01); *G06T 19/00* (2013.01); *G06T 19/006* (2013.01);
(Continued)

(58) Field of Classification Search
CPC ... G06T 19/006; G06T 19/00; G02B 27/0101; H04N 13/30; H04N 13/10; H04N 21/4363; G06F 13/105
See application file for complete search history.

(56) References Cited

U.S. PATENT DOCUMENTS 9,041,623 B2   5/2015 Liu et al.
9,746,671 B2   8/2017 Fujigaki
(Continued)

FOREIGN PATENT DOCUMENTS

CN   103731725 A   4/2014
CN   103891269 A   6/2014
(Continued)

OTHER PUBLICATIONS

Communication dated Feb. 7, 2018, issued by the European Patent Office in counterpart European application No. 15877190.7.
(Continued)

*Primary Examiner* — Muhammad N Edun
(74) *Attorney, Agent, or Firm* — Sughrue Mion, PLLC

(57) ABSTRACT

A master device providing an image to a slave device providing a virtual reality service is provided. The master device includes: a content input configured to receive an input stereoscopic image; a communicator configured to perform communication with the slave device providing the virtual reality service; and a processor configured to determine a viewpoint region corresponding to a motion state of the corresponding slave device in the input stereoscopic image on the basis of motion information received from the slave device and control the communicator to transmit an image of the identified viewpoint region to the slave device.

12 Claims, 14 Drawing Sheets

(51) Int. Cl.
*H04N 21/4363* (2011.01)
*H04N 13/10* (2018.01)
*H04N 13/30* (2018.01)
*G06F 13/10* (2006.01)

(52) U.S. Cl.
CPC ............. *H04N 13/10* (2018.05); *H04N 13/30* (2018.05); *H04N 21/4363* (2013.01); *G06F 13/105* (2013.01)

(56) References Cited

U.S. PATENT DOCUMENTS

| | | |
|---|---|---|
| 2012/0041599 A1 | 2/2012 | Townsend et al. |
| 2012/0274750 A1 | 11/2012 | Strong |
| 2013/0083173 A1 | 4/2013 | Geisner et al. |
| 2014/0085183 A1 | 3/2014 | Na |
| 2014/0132705 A1 | 5/2014 | Kira et al. |
| 2014/0232620 A1 | 8/2014 | Fujigaki |
| 2014/0354689 A1 | 12/2014 | Lee et al. |
| 2014/0361977 A1 | 12/2014 | Stafford et al. |
| 2017/0352188 A1* | 12/2017 | Levitt .................. G06F 1/1626 |

FOREIGN PATENT DOCUMENTS

| | | |
|---|---|---|
| JP | 2010-217719 A | 9/2010 |
| JP | 2012-252410 A | 12/2012 |
| KR | 10-2012-0044461 A | 5/2012 |
| KR | 10-1284348 B1 | 7/2013 |
| KR | 10-1329935 B1 | 11/2013 |
| KR | 10-2014-0034252 A | 3/2014 |

OTHER PUBLICATIONS

International Search Report, issued by International Searching Authority in corresponding International Application No. PCT/KR2015/013129, dated Mar. 18, 2016, (PCT/ISA/210).
Written Opinion, issued by International Searching Authority in corresponding International Application No. PCT/KR2015/013129, dated Mar. 18, 2016, (PCT/ISA/237).
Communication dated Nov. 7, 2017, issued by the European Patent Office in counterpart European application No. 15877190.7.
Communication dated Jul. 24, 2019 issued by the State Intellectual Property Office of P.R. China in counterpart Chinese Application No. 201580075494.2.

* cited by examiner

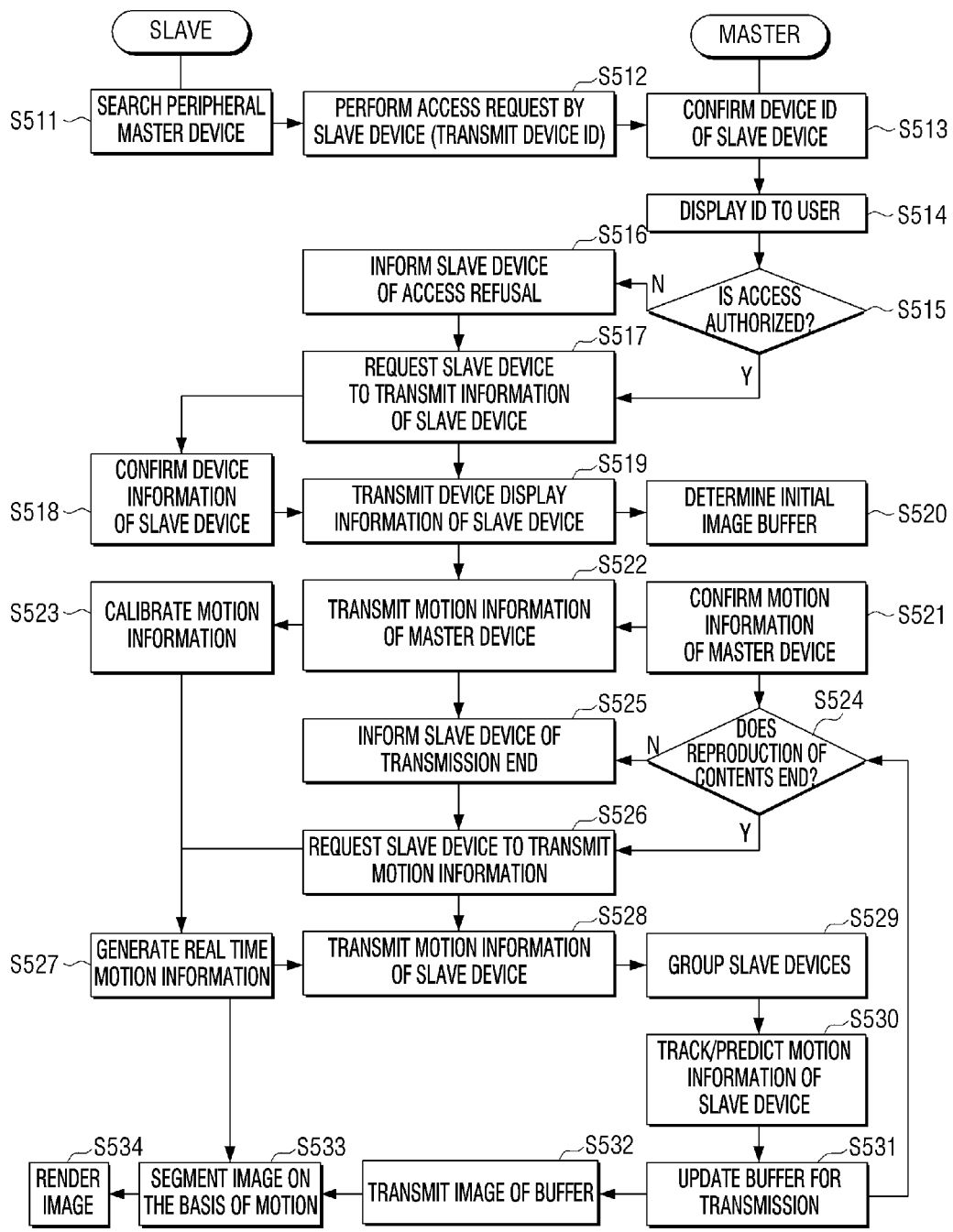

FUNCTION OF ALIGNING VISUAL FIELDS WITH EACH OTHER IS TURNED OFF

FUNCTION OF ALIGNING VISUAL FIELDS WITH EACH OTHER IS TURNED ON

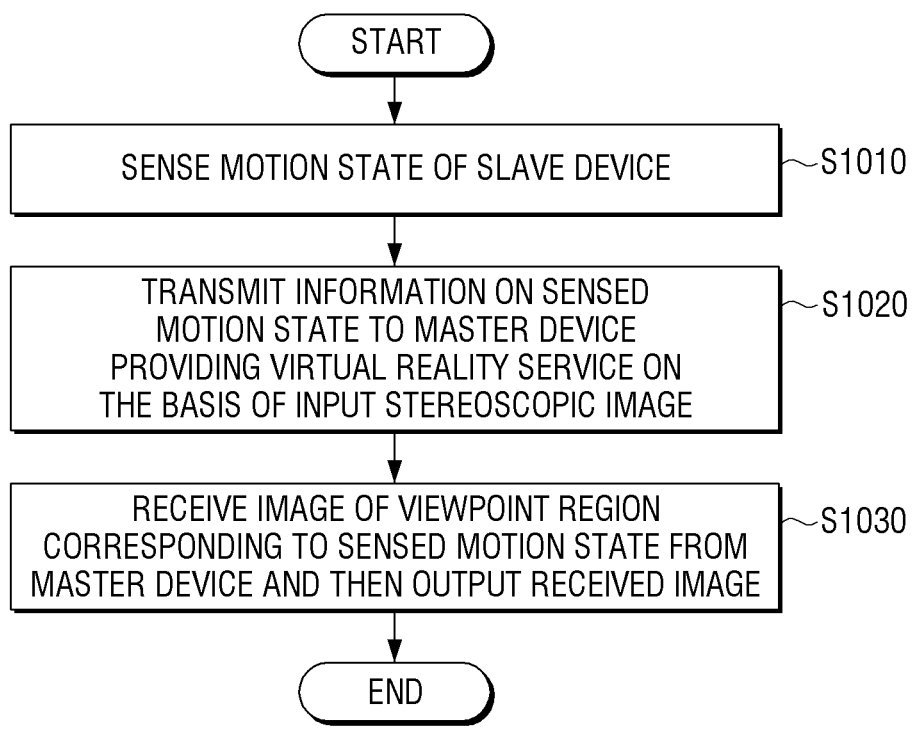

MASTER DEVICE, SLAVE DEVICE, AND CONTROL METHOD THEREFOR

TECHNICAL FIELD

Apparatuses and methods consistent with the present disclosure relate to a master device, a slave device, and a control method therefor, and more particularly, to a master device and a slave device providing a virtual reality (VR) service, and a control method therefor.

BACKGROUND ART

Generally, a virtual reality (VR) technique indicates a technique ultimately aiming to maximize the utilization of information by allowing all the senses (a sight sense, a hearing sense, a smell sense, a taste sense, and a touch sense) of the human body to be immersed in the virtually created world through interaction thereamong in a three-dimensional (3D) virtual environment created through a computer graphic (CG) technique and similar to an actual environment to three-dimensionally reproduce a virtual space to a participant and immerse a person in the virtual space.

For example, when a user wears a VR headset, a skiing ground covered with white snow appears in front of his/her eyes. Even though he/she turns his/her head in all directions, he/she is in the middle of the skiing ground. Snowboards on which his/her feet are put start to be slid, and a cliff then appears suddenly. At this moment, an empty space appears below the feet. Although his/her head recognizes the fact that it is virtual reality, he/she feels as if a virtual skiing ground in the headset is reality due to excellent realism.

As described above, a VR service provides a new experience to the user, but is not commercially served in relation to purchase and consumption of contents.

DISCLOSURE

Technical Problem

The present disclosure provides a master device capable of providing an appropriate image to each slave device on the basis of motion information of each slave device, a slave device, and a control method therefor.

Technical Solution

According to an aspect of the present disclosure, a master device providing an image to a slave device providing a virtual reality service includes: a content input configured to receive an input stereoscopic image; a communicator configured to perform communication with the slave device providing the virtual reality service; and a processor configured to identify a viewpoint region corresponding to a motion state of the corresponding slave device in the input stereoscopic image on the basis of motion information received from the slave device and control the communicator to transmit an image of the identified viewpoint region to the slave device.

The processor may project a left-eye image and a right-eye image included in the input stereoscopic image into a virtual stereoscopic space to provide a left-eye stereoscopic space image and a right-eye stereoscopic space image, obtain the viewpoint region corresponding to the motion state of the slave device in the provided left-eye stereoscopic space image and right-eye stereoscopic space image, and transmit the obtained viewpoint region to the slave device.

The processor may secure one region of an image buffer as a transmission buffer on the basis of device display information received from the slave device, buffer an image corresponding to the motion information of the slave device in the transmission buffer, and transmit the buffered image to the corresponding slave device.

The master device may further include a sensor sensing a motion state of the master device, wherein the processor calibrates the motion information received from the slave device based on the sensed motion state to provide relative motion information corresponding to the slave device, and identifies the viewpoint region corresponding to the motion state of the slave device on the basis of the provided relative motion information.

The processor may predict the future motion information of the slave device on the basis of currently received motion information of the slave device, and transmit an image of a viewpoint region corresponding to the future motion state of the slave device in the input stereoscopic image to the slave device on the basis of the predicted motion information.

The processor may group a plurality of slave devices into one group in the case in which motion information received from the plurality of slave devices belongs to a predetermined threshold range, and transmit an image of the same viewpoint region to the plurality of slave devices belonging to the same group.

According to another aspect of the present disclosure, a slave device providing a virtual reality service includes: a communicator configured to perform communication with a master device providing a virtual reality service on the basis of an input stereoscopic image; a sensor configured to sense a motion state of the slave device; and a processor configured to control the communicator to transmit information on the sensed motion state to the master device, and receive an image of a viewpoint region corresponding to the sensed motion state from the master device and output the received image.

When motion information of the master device is received from the master device, the processor may calibrate the sensed motion state based on the received motion information to provide relative motion information corresponding to the slave device, and transmit the provided relative motion information to the master device.

When an image of a viewpoint region corresponding to the future motion state predicted on the basis of the transmitted information is received from the master device, the processor may output an image of a viewpoint region identified on the basis of a real time motion state in the received image.

The processor may transmit device information of the slave device together with the information on the sensed motion state to the master device, and receive the image of the viewpoint region corresponding to the sensed motion state from the master device on the basis of the device information.

According to still another aspect of the present disclosure, an image system including a master device and a slave device providing a virtual reality service includes: the slave device configured to sense a motion state and transmit motion information on the sensed motion state to the master device; and the master device configured to identify a viewpoint region corresponding to the motion state of the corresponding slave device in an input stereoscopic image on the basis of the motion information received from the slave device and transmit an image of the identified viewpoint region to the slave device.

According to yet still another aspect of the present disclosure, a control method for a master device providing an image to a slave device providing a virtual reality service includes: receiving an input stereoscopic image; determining a viewpoint region corresponding to a motion state of the corresponding slave device in the input stereoscopic image on the basis of motion information received from the slave device; and transmitting an image of the identified viewpoint region to the slave device.

The control method may further include: projecting a left-eye image and a right-eye image included in the input stereoscopic image into a virtual stereoscopic space to provide a left-eye stereoscopic space image and a right-eye stereoscopic space image; and obtaining the viewpoint region corresponding to the motion state of the slave device in the provided left-eye stereoscopic space image and right-eye stereoscopic space image.

In the transmitting of the image of the identified viewpoint region to the slave device, one region of an image buffer may be secured as a transmission buffer on the basis of device display information received from the slave device, and an image corresponding to the motion information of the slave device may be buffered in the transmission buffer and be then transmitted to the corresponding slave device.

The control method may further include sensing a motion state of the master device, wherein in the determining of the viewpoint region, the motion information received from the slave device is calibrated based on the sensed motion state to provide relative motion information corresponding to the slave device, and the viewpoint region corresponding to the motion state of the slave device is identified on the basis of the provided relative motion information.

The control method may further include: predicting the future motion information of the slave device on the basis of currently received motion information of the slave device and transmitting an image of a viewpoint region corresponding to the future motion state of the slave device in the input stereoscopic image to the slave device on the basis of the predicted motion information.

In addition, in the transmitting of the image of the identified viewpoint region to the slave device, a plurality of slave devices may be grouped into one group in the case in which motion information received from the plurality of slave devices belongs to a predetermined threshold range, and an image of the same viewpoint region may be transmitted to the plurality of slave devices belonging to the same group.

According to yet still another aspect of the present disclosure, a control method for a slave device providing a virtual reality service includes: sensing a motion state of the slave device; transmitting information on the sensed motion state to a master device providing a virtual reality service on the basis of an input stereoscopic image; and receiving an image of a viewpoint region corresponding to the sensed motion state from the master device and outputting the received image.

In the transmitting of the information on the sensed motion state to the master device, when motion information of the master device is received from the master device, the sensed motion state may be calibrated based on the received motion information to provide relative motion information corresponding to the slave device, and the provided relative motion information may be transmitted to the master device.

The control method may further include outputting the image of the viewpoint region identified on the basis of a real time motion state in an image of a viewpoint region corresponding to the future motion state predicted on the basis of the motion information transmitted from the master device when the image of the viewpoint region corresponding to the future motion state is received.

Advantageous Effects

As described above, according to the diverse exemplary embodiments of the present disclosure, a plurality of users may receive appropriate images capable of providing optimal immersion, respectively, while sharing one content with one another.

DESCRIPTION OF DRAWINGS

FIG. 5 is a sequence diagram for describing operations between a master device and a slave device according to an exemplary embodiment of the present disclosure in detail.

FIG. 10 is a flow chart for describing a control method for a slave device according to an exemplary embodiment of the present disclosure.

BEST MODE

Figure 1:
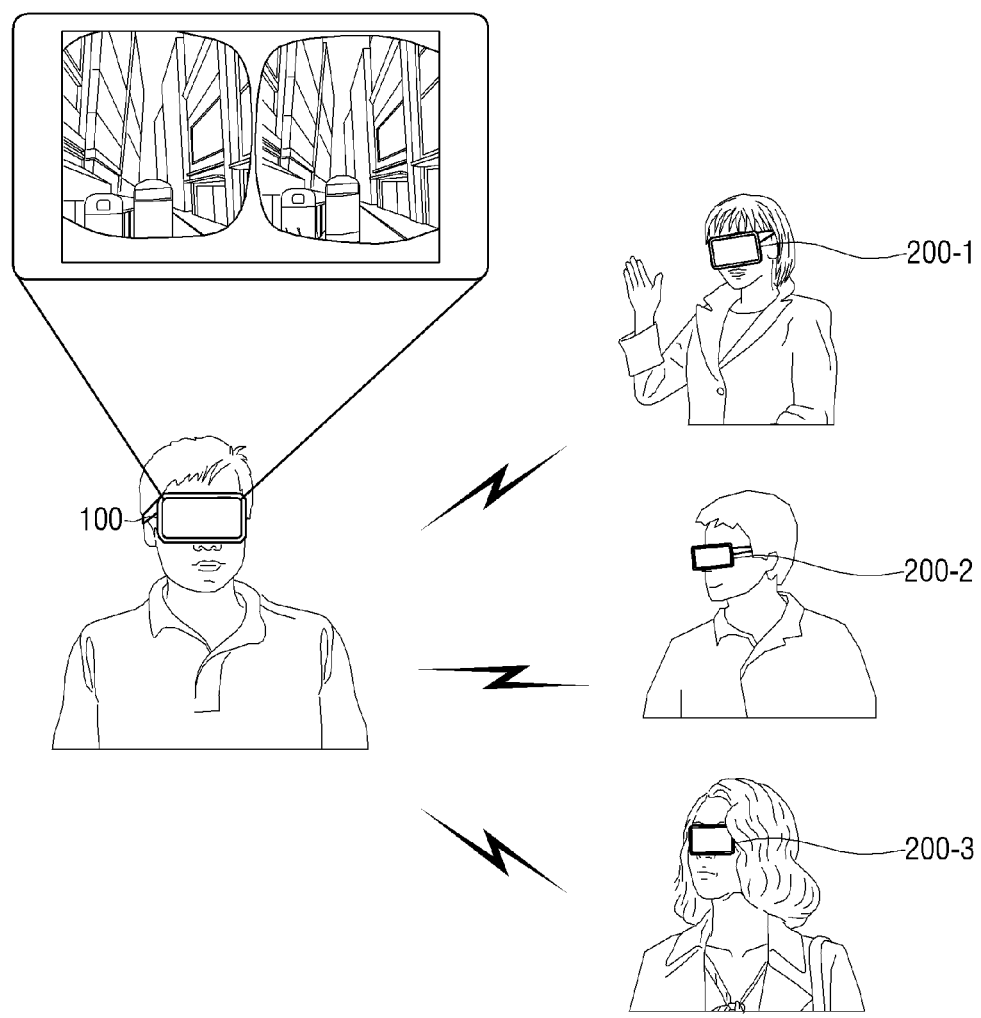
FIG. 1 is a view illustrating an implementation of a user terminal apparatus according to an exemplary embodiment of the present disclosure.

FIG. 1 is a view illustrating an implementation of a user terminal apparatus according to an exemplary embodiment of the present disclosure.

As illustrated in FIG. 1, virtual reality (VR) devices 100, 200-1, 200-2, and 200-3 according to an exemplary embodiment of the present disclosure may be implemented in a form of head wearable terminals, that is, headsets, providing a virtual reality service.

In detail, the VR devices 100, 200-1, 200-2, and 200-3 may be implemented to track movement of user's heads to immediately update visual field images, and be implemented to provide three-dimensional (3D) images as well as two-dimensional (2D) images. For example, when users wear the headsets, the VR devices completely dominate visual fields of the users to provide stereoscopic images and sounds of 360°, and gyro sensors, acceleration sensors, and the like, of the VR devices may be implemented to sense that the users move their heads up and down or left and right to provide visual effects appropriate for moving directions of the heads. The VR may be a concept including augmented reality (AR) overlapping and three-dimensionally displaying information with and on a screen, or the like, in a broad sense.

In addition, the VR devices 100, 200-1, 200-2, and 200-3 may be implemented in a form in which they are completely wirelessly used, since smartphones are connected to the VR devices 100, 200-1, 200-2, and 200-3 and are used as displays and processors or batteries of the smartphones are thus used as they are. However, the VR devices are not necessarily limited thereto, but may also be implemented by VR devices integrated with displays.

In addition, headset bodies of the VR devices 100, 200-1, 200-2, and 200-3 may be mounted with manipulating track pads, return buttons, volume adjusting keys, and the like, and the VR devices 100, 200-1, 200-2, and 200-3 may be implemented so that images in front of eyes are projected on screens using cameras of rear surfaces of the smartphones. Further, the VR devices 100, 200-1, 200-2, and 200-3 may be implemented to track movement using the gyro sensors and the acceleration sensors embedded in the smartphones as well as sensors of the headset bodies.

Meanwhile, according to an exemplary embodiment of the present disclosure, a master VR device 100 (hereinafter, referred to as a master device) may perform communication with slave devices 200-1, 200-2, and 200-3 (hereinafter, referred to as slave devices) to stream input contents to the slave devices 200-1, 200-2, and 200-3. Hereinafter, the present disclosure will be described in detail with reference to the drawings.

Figure 2A:
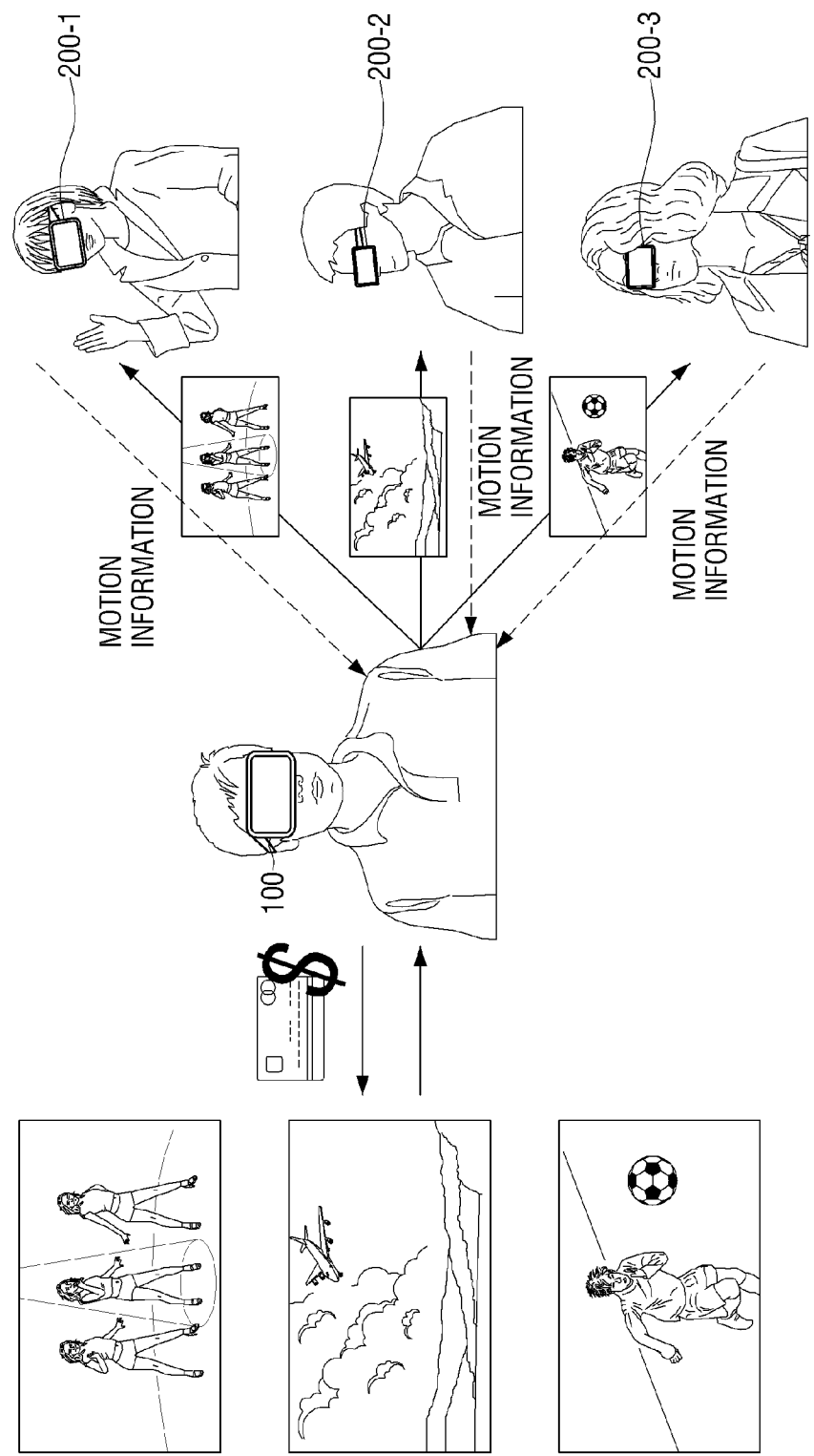
FIGS. 2A and 2B are views for describing scenarios according to diverse exemplary embodiments of the present disclosure.
Figure 2B:
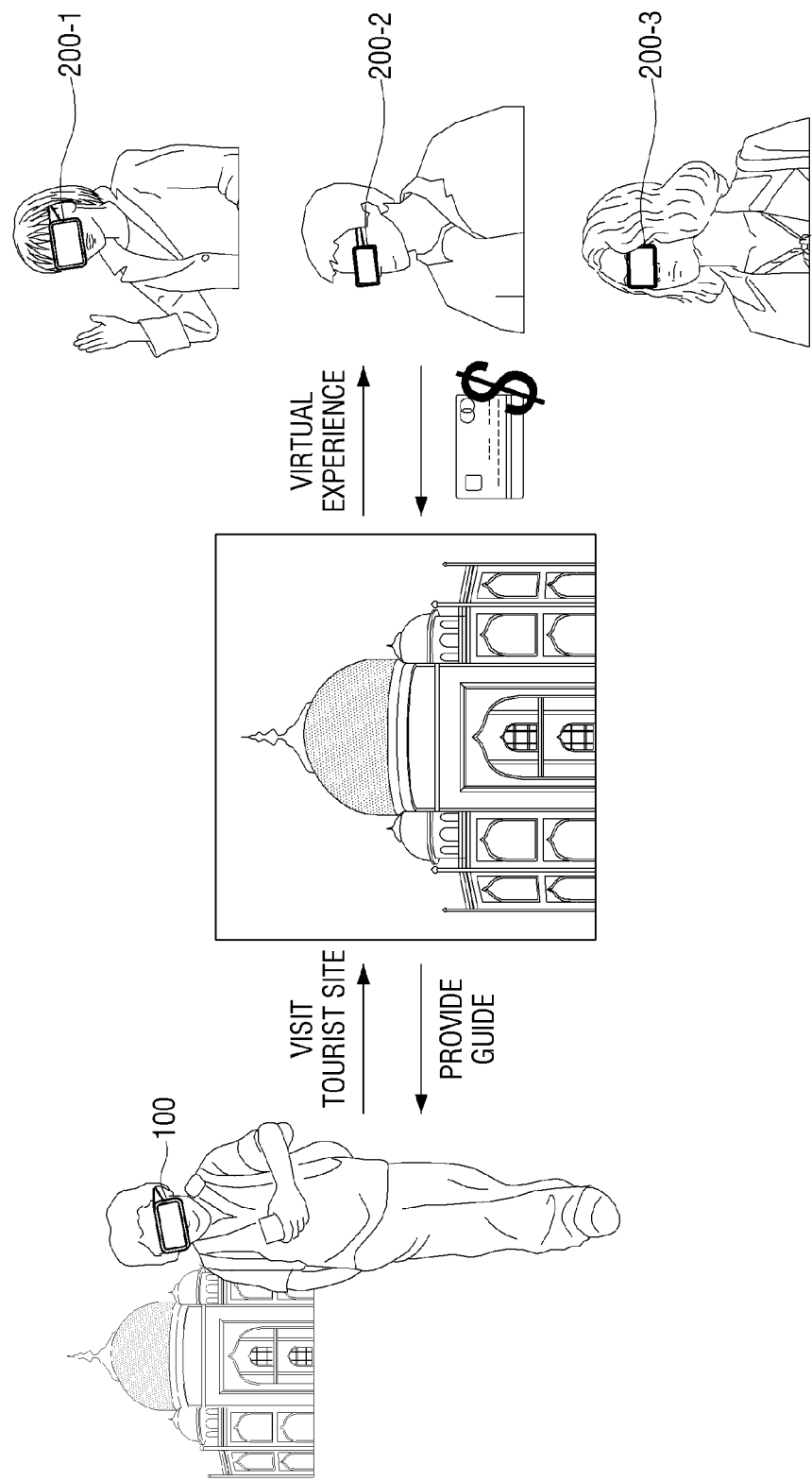

FIGS. 2A and 2B are views for describing scenarios according to diverse exemplary embodiments of the present disclosure.

A scenario according to an exemplary embodiment of the present disclosure illustrated in FIG. 2A may be a form in which only the master device 100 has an access authority to contents and the slave devices 200-1, 200-2, and 200-3 receive the contents streamed from the master device 100. In this case, the master device 100 may purchase paid contents, decide whether or not accesses of the slave devices 200-1, 200-2, and 200-3 are authorized, and then share the purchased contents with the slave devices 200-1, 200-2, and 200-3. In detail, the slave devices 200-1, 200-2, and 200-3 of which the accesses are authorized may transmit their motion information to the master device 100, and the master device 100 may transmit sub-contents corresponding to the slave devices 200-1, 200-2, and 200-3 on the basis of the motion information of each of the slave devices 200-1, 200-2, and 200-3.

A scenario according to another exemplary embodiment illustrated in FIG. 2B may be a form in which when a user wearing a master device tours a famous museum, a historic site, or the like, he/she receives a virtual tour guide and provides the obtained virtual tour guide to the slave devices 200-1, 200-2, and 200-3. In this case, users of the slave devices 200-1, 200-2, and 200-3 positioned at a long distance may receive the same tour experience as that of the user of the master device.

Hereinafter, diverse exemplary embodiments of the present disclosure for implementing the diverse scenarios described above will be described.

Figure 3A:
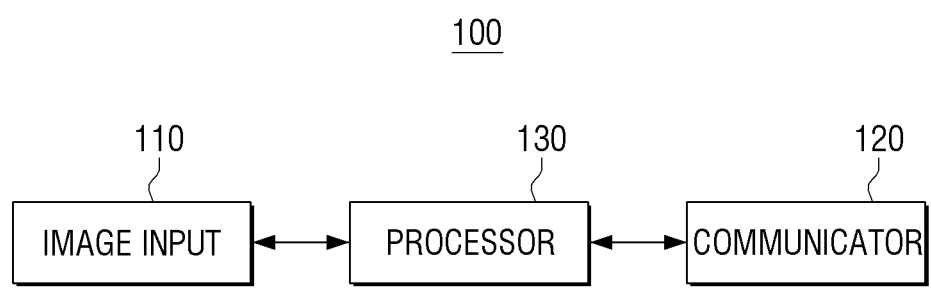
FIGS. 3A to 3C are block diagrams illustrating components of a master device according to an exemplary embodiment of the present disclosure.
Figure 3B:
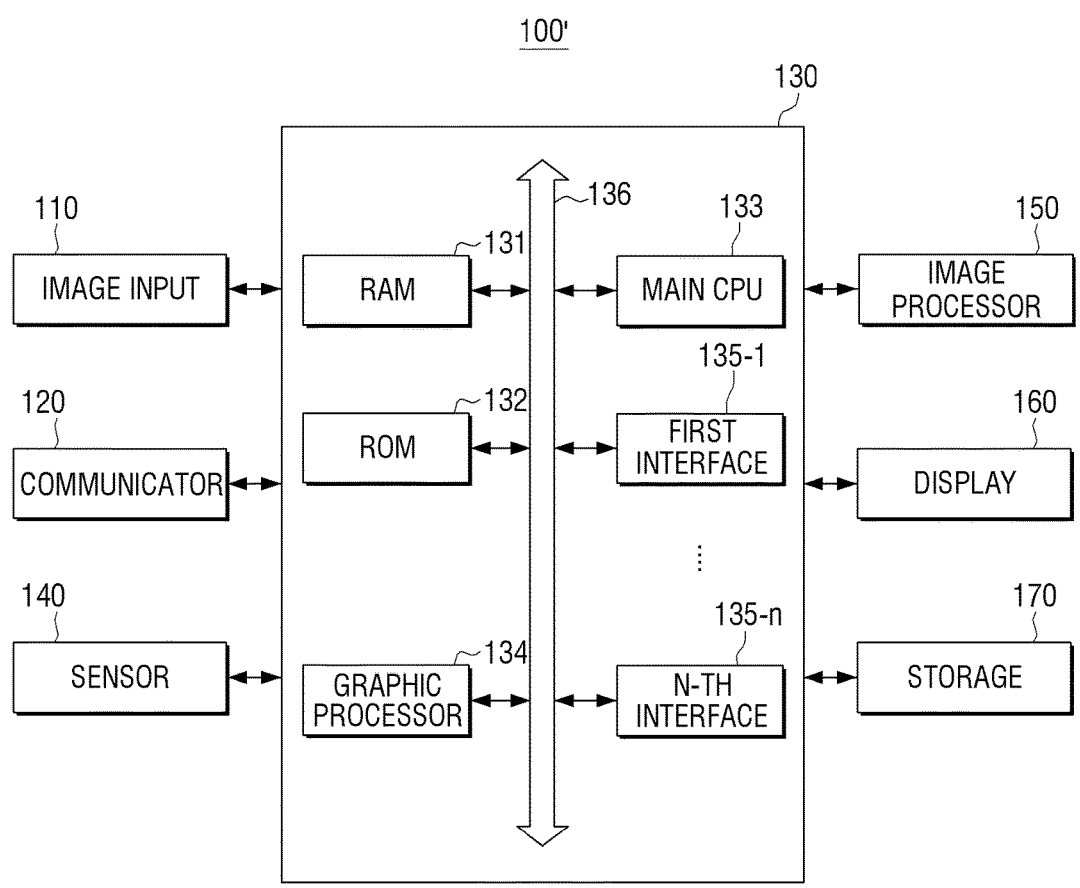
Figure 3C:
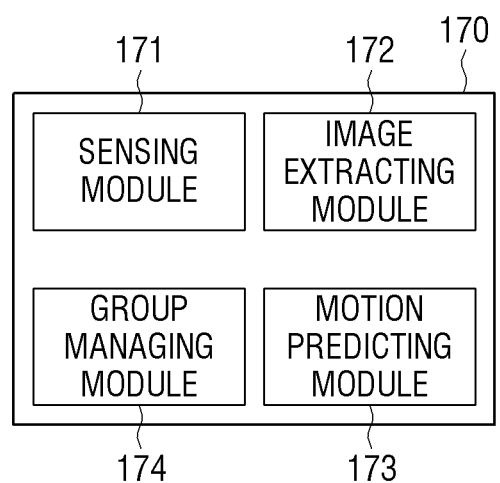

FIGS. 3A to 3C are block diagrams illustrating components of a master device according to an exemplary embodiment of the present disclosure.

As illustrated in FIG. 3A, the master device 100 according to an exemplary embodiment of the present disclosure includes an image input 110, a communicator 120, and a processor 130. Here, the master device 100 provides a virtual reality service, and serves to provide a VR image to a slave device providing a virtual reality service.

The image input 110 receives an input image. Here, the input image may be a 3D image including a left-eye image and a right-eye image for providing the VR service, but is not limited thereto. That is, the input image may be a panorama VR content, a general 2D image, or the like. For example, in the case in which the 3D image including the left-eye image and the right-eye image is received through the image input 110, a processor 130 to be described below may provide a panorama VR image on the basis of the received 3D image. However, in some cases, the panorama VR image may be provided using contents pre-stored in the master device 100 itself or the panorama VR image itself may be pre-stored.

The communicator 120 performs communication with the slave devices 200-1, 200-2, and 200-3. Here, the communicator 120 may perform communication with the slave devices 200-1, 200-2, and 200-3 or an external server (not illustrated) through various communication manners such as a Bluetooth (BT) manner, a wireless fidelity (WI-FI) manner, a Zigbee manner, an infrared (IR) manner, a serial interface manner, a universal serial bus (USB) manner, a near field communication (NFC) manner, and the like. For example, the communicator 120 may receive 3D image contents in a streaming or download form from the external server.

In detail, when a predetermined event occurs, the communicator 120 may perform the communication with the slave devices 200-1, 200-2, and 200-3 depending on a predetermined communication manner to become an interworking state. Here, the interworking state may mean all the states in which communication is possible, such as an operation in which communication between the master device 100 and the slave devices 200-1, 200-2, and 200-3 is initialized, an operation in which a network is formed, an operation in which device pairing is performed, and the like. For example, device identification information of the slave devices 200-1, 200-2, and 200-3 may be provided to the master device 100, and a pairing procedure between the slave devices 200-1, 200-2, and 200-3 and the master device 100 may be performed accordingly. For example, when a predetermined event occurs in the master device 100 or the slave devices 200-1, 200-2, and 200-3, the communicator 120 may search peripheral devices through a digital living network alliance (DLNA) technique, and perform pairing with the searched devices to become an interworking state.

The processor 130 controls a general operation of the master device 100.

Particularly, the processor 130 may identify a viewpoint (or direction) region corresponding to motion states of the corresponding slave devices 200-1, 200-2, and 200-3 in the input 3D image on the basis of the motion information received from the slave devices 200-1, 200-2, and 200-3. Then, the processor 130 may control the communicator 120 to transmit an image of the identified viewpoint region to the slave devices. Here, the motion information may be real time direction information, angle information, and the like, on all the directions of the slave devices 200-1, 200-2, and 200-3, but is not limited thereto. That is, the motion information may include moving speed information, rotation information, and the like. In addition, after initial direction information and angle information are received from the slave devices 200-1, 200-2, and 200-3, moving direction and angle information based on the previously received direction and angle information may be received. However, the present disclosure is not limited thereto.

In this case, the processor 130 may transmit an image corresponding to the slave devices 200-1, 200-2, and 200-3 to the corresponding slave devices 200-1, 200-2, and 200-3 on the basis of device information, for example, device IDs, received from the slave devices 200-1, 200-2, and 200-3. In addition, the processor 130 may secure one region of an image buffer as a transmission buffer on the basis of device display information received from the slave devices 200-1, 200-2, and 200-3, buffer an image corresponding to the motion information of the slave devices in the transmission buffer, and transmit the buffered image to the corresponding slave devices 200-1, 200-2, and 200-3. In this case, the processor 130 may separately secure transmission buffers corresponding to each of the slave devices 200-1, 200-2, and 200-3.

In this case, the processor 130 may project the left-eye image and the right-eye image included in the input stereoscopic image into a virtual stereoscopic space to provide a left-eye stereoscopic space image and a right-eye stereoscopic space image, obtain a viewpoint region corresponding to motion states of each of the slave devices 200-1, 200-2, and 200-3 in the provided left-eye stereoscopic space image and right-eye stereoscopic space image, and transmit the obtained viewpoint region to the respective slave devices 200-1, 200-2, and 200-3.

The processor 130 may decompress (or decode) the input image, store the decompressed (or decoded) image in the image buffer, obtain a region corresponding to the motion information of the slave devices 200-1, 200-2, and 200-3 from the image stored in the image buffer, compress (or encode) the obtained image, and then transmit the compressed (or encoded) image to the slave devices 200-1, 200-2, and 200-3.

Alternatively, the processor 130 may obtain a region corresponding to the motion information of the slave devices 200-1, 200-2, and 200-3, decode the obtained region, and then transmit the decoded region to the slave devices 200-1, 200-2, and 200-3 or may decode only a margin region other than the previously transmitted image in the region corresponding to the motion information and then transmit the decoded margin region.

Alternatively, the processor 130 may transmit a margin image for a region decided on the basis of the motion information of the slave devices 200-1, 200-2, and 200-3 together with a decoded main image currently output from the master device 100 as a low image quality image or an encoded image using a codec to the slave devices 200-1, 200-2, and 200-3. Here, the margin image may be an image other than the decoded main image in the region decided on the basis of the motion information of the slave devices 200-1, 200-2, and 200-3. In this case, the slave devices 200-1, 200-2, and 200-3 may decode the received margin region, synthesize the decoded margin image with the received main image, and then output the synthesized image, thereby minimizing a delay due to image transmission.

In addition, the processor 130 may predict the future motion information of the slave devices 200-1, 200-2, and 200-3 on the basis of the currently received motion information of the slave devices 200-1, 200-2, and 200-3, and transmit an image of a viewpoint region corresponding to the future motion state of the slave devices 200-1, 200-2, and 200-3 in the input image to the slave devices 200-1, 200-2, and 200-3 on the basis of the predicted motion information. For example, the processor 130 may track and predict the future motion states of the slave devices 200-1, 200-2, and 200-3 using a filtering method such as the existing Kalman filter.

In addition, the processor 130 may group a plurality of slave devices into one group in the case in which motion information received from the plurality of slave devices belongs to a predetermined threshold range, and transmit an image of the same viewpoint region to the plurality of slave devices belonging to the same group. For example, the processor 130 may group first and second slave devices having motion information between 10° to 15° in a right direction into one group, and transmit an image of the same viewpoint region corresponding to the corresponding motion information to the first and second slave devices.

FIG. 3B is a block diagram illustrating detailed components of the master device illustrated in FIG. 3A. As illustrated in FIG. 3B, a master device 100' includes an image input 110, a communicator 120, a processor 130, a sensor 140, an image processor 150, a display 160, and a storage 170. A detailed description for components overlapping components illustrated in FIG. 3A among components illustrated in FIG. 3B will be omitted.

The sensor 140 senses a motion state of the master device.

In detail, the sensor 140 includes a magnetism sensor, a gyro sensor, an acceleration sensor, or the like, for sensing the motion state. The magnetism sensor is a sensor for sensing a rotation state, a moving direction, and the like, of the master device 100'. The gyro sensor is a sensor for sensing a rotation angle of the master device 100'. The sensor 140 may include both of the magnetism sensor and the gyro sensor. However, even though the sensor includes only one of the magnetism sensor and the gyro sensor, the rotation state of the master device 100' may be sensed. The acceleration sensor is a sensor for sensing an inclined level of the master device 100'.

In addition, the sensor 140 may further include a touch sensor, a proximity sensor, and the like, for sensing a touch through a touch pad attached to the device or a hovering manipulation.

In this case, the processor 130 may calibrate the motion information received from the slave devices based on the motion state sensed in the sensor 140 to provide relative motion information corresponding to the slave devices, and may identify a viewpoint region corresponding to the motion states of the slave devices on the basis of the provided relative motion information. However, this is only an example, and in some case, the processor 130 may also transmit motion information corresponding to the sensed motion state to the slave devices and receive the calibrated relative motion information from the slave devices. That is, a calibration process may be performed in any one of the master device and the slave devices. Here, the relative motion information of the slave devices may be 3° in the right direction based on direction information of the master device 100, for example, in the case in which the direction information of the master device 100 is 10° in the right direction and direction information of the slave device is 13° in the right direction.

The image processor 150 may serve to render an image corresponding to the motion state sensed in the sensor 140 and provide the rendered image to the display 160.

The display 160 displays the image rendered through the image processor 150. In this case, the display 160 may be implemented by a liquid crystal display (LCD) panel, an organic light emitting diode (OLED), or the like, but is not limited thereto. In addition, the display 160 may also be implemented by a flexible display, a transparent display, or the like, in some cases. Meanwhile, in the case in which the smartphone is connected to the master device and is used as a monitor as described with reference to FIG. 1, the display 160 may be implemented by a display of the smartphone.

The storage 170 stores various data such as an operating system (O/S) software module for driving the master device 100', various multimedia contents, and the like, therein.

Particularly, referring to FIG. 3C, programs such as a sensing module 171, an image obtaining module 172, a motion predicting module 173, a group managing module 174, and the like, may be stored in the storage 170.

The sensing module 171 is a module of collecting information from various sensors and analyzing and managing the collected information. For example, the sensing module 171 may include a motion recognizing module, a touch recognizing module, and an audio recognizing module, and the like.

The image obtaining module 172 serves to decide and obtain an image corresponding to the motion information collected/analyzed by the sensing module 171 or the motion information received from the slave devices.

The motion predicting module 173 serves to predict the future motion information of the slave devices on the basis of the currently received motion information of the slave devices to provide prediction motion information.

The group managing module 174 serves to group and manage the plurality of slave devices into one group in the case in which the motion information received from the plurality of slave devices belongs to the predetermined threshold range.

Meanwhile, the operation of the processor 130 described above may be performed by a program stored in the storage 170.

In detail, the processor 130 includes a random access memory (RAM) 131, a read only memory (ROM) 132, a main central processing unit (CPU) 133, a graphic processor 134, first to n-th interfaces 135-1 to 135-n, and a bus 136.

The RAM 131, the ROM 132, the main CPU 133, the graphic processor 134, the first to n-th interfaces 135-1 to 135-n, and the like, may be connected to one another through the bus 136.

The first to n-th interfaces 135-1 to 135-n are connected to the various components described above. One of the interfaces may be a network interface connected to an external apparatus through a network.

The main CPU 133 accesses the storage 170 to perform booting using the O/S stored in the storage 170. In addition, the main CPU 133 performs various operations using various programs, contents, data, and the like, stored in the storage 170. For example, the main CPU 133 may collect/analyze the motion information using the sensing module 171, and decide and obtain an image corresponding to the motion information analyzed using the image obtaining module 172 or the motion information received from the slave device.

An instruction set for booting a system, or the like, is stored in the ROM 132. When a turn-on command is input to supply power to the main CPU 133, the main CPU 133 copies the operating system (0/S) stored in the storage 170 to the RAM 131 depending on an instruction stored in the ROM 132, and execute the O/S to boot the system. When the booting is completed, the main CPU 133 copies various application programs stored in the storage 170 to the RAM 131, and executes the application programs copied to the RAM 131 to perform various operations.

The graphic processor 134 renders a screen including various objects such as an icon, an image, a text, and the like, using a calculator (not illustrated) and a renderer (not illustrated). The calculator (not illustrated) calculates attribute values such as coordinate values at which the respective objects will be displayed, forms, sizes, colors, and the like, of the respective objects depending on a layout of a screen on the basis of a received control command. The renderer (not illustrated) renders screens of various layouts including objects on the basis of the attribute values calculated in the calculator (not illustrated).

Figure 4:
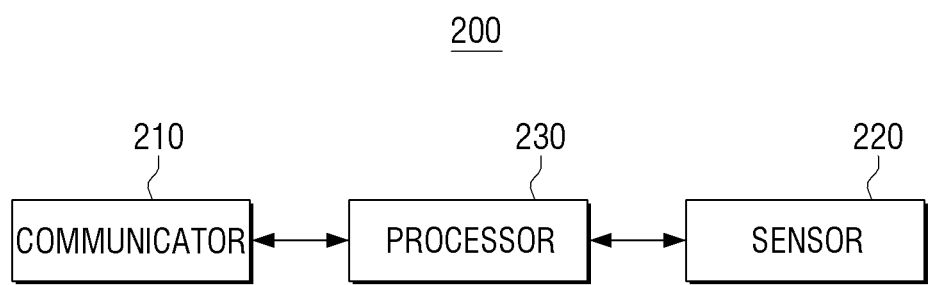
FIG. 4 is a block diagram illustrating components of a slave device according to an exemplary embodiment of the present disclosure.

FIG. 4 is a block diagram illustrating components of a slave device according to an exemplary embodiment of the present disclosure.

As illustrated in FIG. 4, the slave device 200 according to an exemplary embodiment of the present disclosure includes a communicator 210, a sensor 220, and a processor 230. Here, the slave device 200 serves to receive a VR content from the master device 100 and provide a virtual reality service. Meanwhile, since a basic structure and operation of the slave device 200 are the same as those of the master device 100 described with reference to FIGS. 3A to 3C, only unique operations of the slave device 200 will be described.

The communicator 210 performs communication with the master device 100. For example, the communicator 210 may receive a 3D image corresponding to a motion state of the slave device in a streaming form from the master device 100.

The sensor 220 senses the motion state of the slave device 200.

The processor 230 controls the communicator 210 to transmit information on the motion state sensed by the sensor 220 to the master device 100, and receive an image of a viewpoint region corresponding to the sensed motion state from the master device 100 and output the image through the display.

In detail, when motion information of the master device 100 is received from the master device 100, the processor 230 may calibrate the motion state sensed by the sensor 220 based on the received motion information to provide relative motion information corresponding to the slave device 200, and transmit the provided relative motion information to the master device 100.

In addition, when an image of a viewpoint region corresponding to the predicted future motion state is received from the master device 100, the processor 230 may output an image of a viewpoint region identified on the basis of a real time motion state in the received image.

Further, when a decoded main image currently provided through the master device 100 a margin image for a region decided on the basis of the motion information of the slave device 200 are received as a low image quality image or an encoded image from the master device 100, the processor 230 may decode the received margin image, synthesize the decoded image with the received main image, and then output the synthesized image.

In addition, the processor 230 may transmit device information, for example, a device ID, of the slave device 200 to the master device 100, and receive the image of the viewpoint region corresponding to the motion state from the master device 100.

In addition, the processor 230 may transmit device display information, for example, resolution information, of the slave device 200 to the master device 100, and receive an image corresponding to the resolution information from the master device 100.

Meanwhile, since detailed components of the slave device 200 are similar to those of the master device 100' illustrated in FIG. 3B, a detailed description therefor will be omitted.

FIG. 5 is a sequence diagram for describing operations between a master device and a slave device according to an exemplary embodiment of the present disclosure in detail.

As illustrated in the sequence diagram of FIG. 5, the slave device 200 may search a peripheral master device 100 (S511), and then perform an access request to the peripheral master device 100 (S512). In this case, the slave device 200 may transmit its device ID to the master device 100.

Then, the master device 100 confirms the device ID received from the slave device 200 (S513), and outputs the device ID to request a user to confirm the device ID (S514).

When the user authorizes an access of the slave device 200 (S515:Y), the master device 100 may request the slave device 200 to transmit information of the slave device (S517). However, when the user does not authorize the access of the slave device 200 (S515:N), the master device 100 may inform the slave device 200 of access refusal (S516).

Meanwhile, the slave device 200 receiving the information request from the master device 100 confirms its device information (S518), and then transmits device display information, for example, resolution information to the master device 100 (S519).

Then, the master device 100 secures an image buffer region in which an initial image is to be transmitted on the basis of the received display information (S520). For example, the master device 100 may secure a buffer region corresponding to the received resolution information of the slave device 200.

Then, the master device 100 confirms its motion information (S521), and transmits the motion information to the slave device 200 (S522).

In this case, the slave device 200 calibrates its motion information on the basis of the motion information received from the master device 100 (S523).

Meanwhile, the master device 100 decides whether or not reproduction of contents ends (S524), and informs the slave device 200 of a transmission end (S525) in the case in which the reproduction of the contents ends (S524:Y) and requests the slave device 200 to transmit the motion information (S526) in the case in which the reproduction of the contents is continued (S524:Y).

In this case, the slave device 200 provides real time motion information on the basis of a motion information calibration result (S527), and transmits the real time motion information to the master device 100 (S528).

The master device 100 groups and manages a plurality of slave devices on the basis of the motion information transmitted from the slave device 200 (S529).

In addition, the master device 100 tracks the motion information of the slave device 200 to predict the future motion information (S530), and then updates a buffer for transmission.

Then, the master device 100 transmits an image of the buffer for transmission to the slave device 200, and the slave device 200 segments the received image on the basis of the real time motion information provided in S527 (S533), and renders the segmented image (S534).

Figure 6A:
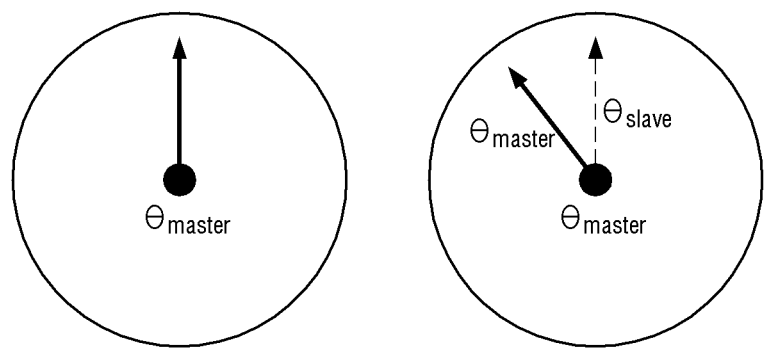
FIGS. 6A and 6B are views for describing a motion information calibration method according to an exemplary embodiment of the present disclosure in detail.
Figure 6B:
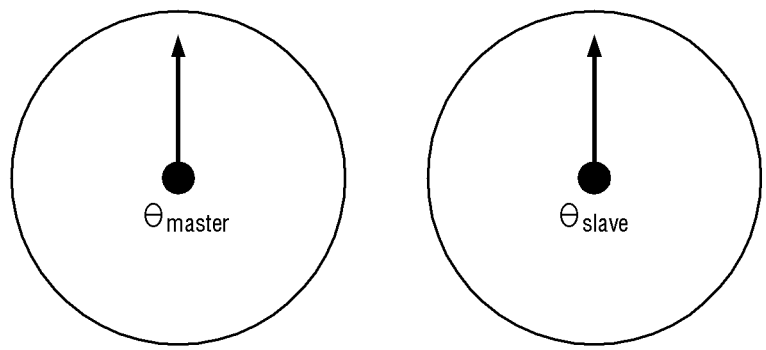

FIGS. 6A and 6B are views for describing a motion information calibration method according to an exemplary embodiment of the present disclosure in detail.

In FIGS. 6A and 6B, a method in which the slave device receives the motion information of the master device and calibrates its motion information on the basis of the motion information of the master device will be described. However, in some cases, the master device may receive the motion information of the slave device and calibrate the motion information of the slave device on the basis of its motion information.

FIG. 6A, which illustrates a case in which a visual field aligning function is turned off according to an exemplary embodiment of the present disclosure, illustrates a case in which a function of aligning a visual field of a user of the master device 100 and a visual field of a user of the slave device 200 with each other is turned off in the slave device 200.

In the case in which the visual field aligning function is turned off, when the slave device 200 initially accesses the master device 100, motion calibration may be performed on the basis of the motion information of the slave device 200 itself. In this case, the slave device 200 may receive an image of a viewpoint different from that of an image provided to the master device 100 at the time of initially accessing the master device 100.

FIG. 6B, which illustrates a case in which the visual field aligning function is turned on according to another exemplary embodiment of the present disclosure, illustrates a case in which the function of aligning the visual field of the user of the master device 100 and the visual field of the user of the slave device 200 with each other is turned on in the slave device 200.

In the case the visual field aligning function is turned on, when the slave device 200 initially accesses the master device 100, the motion information may be calculated after a visual field of the slave device 200 is aligned with that of the master device 100. For example, calibration motion information of the slave device 200 may be calculated by θslave=θslave+(θmaster−θslave). In this case, the slave device 200 may receive an image of a viewpoint that is the same as that of an image provided to the master device 100 at the time of initially accessing the master device 100.

Figure 7:
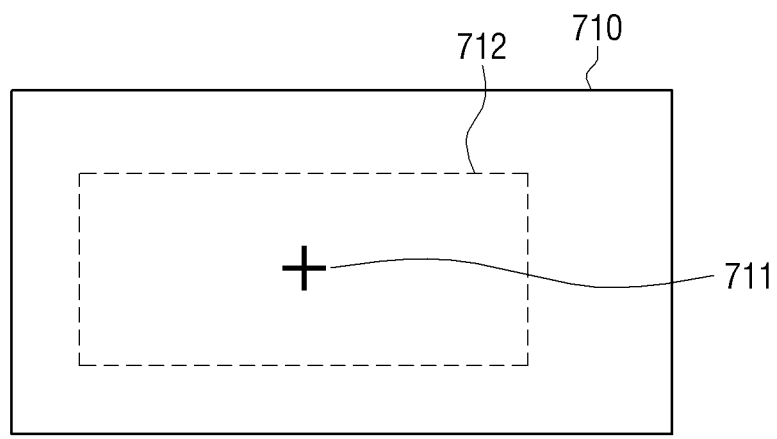
FIG. 7 is a view for describing a motion information based image segmentation method according to an exemplary embodiment of the present disclosure in detail.

FIG. 7 is a view for describing a motion information based image segmentation method according to an exemplary embodiment of the present disclosure in detail.

FIG. 7 illustrates an image 710 transmitted from the master device 100 to the slave device 200, and the master device 100 may transmit the image 710 including an extra adjacent image as well as an image 712 calculated based on a motion based reference position 711 on the basis of the motion information of the slave device 200 to the slave device 200.

In this case, the slave device 200 may segment the received image 710 based on the motion based reference position 711 to render the segmented image 712 and output the rendered image.

Figure 8:
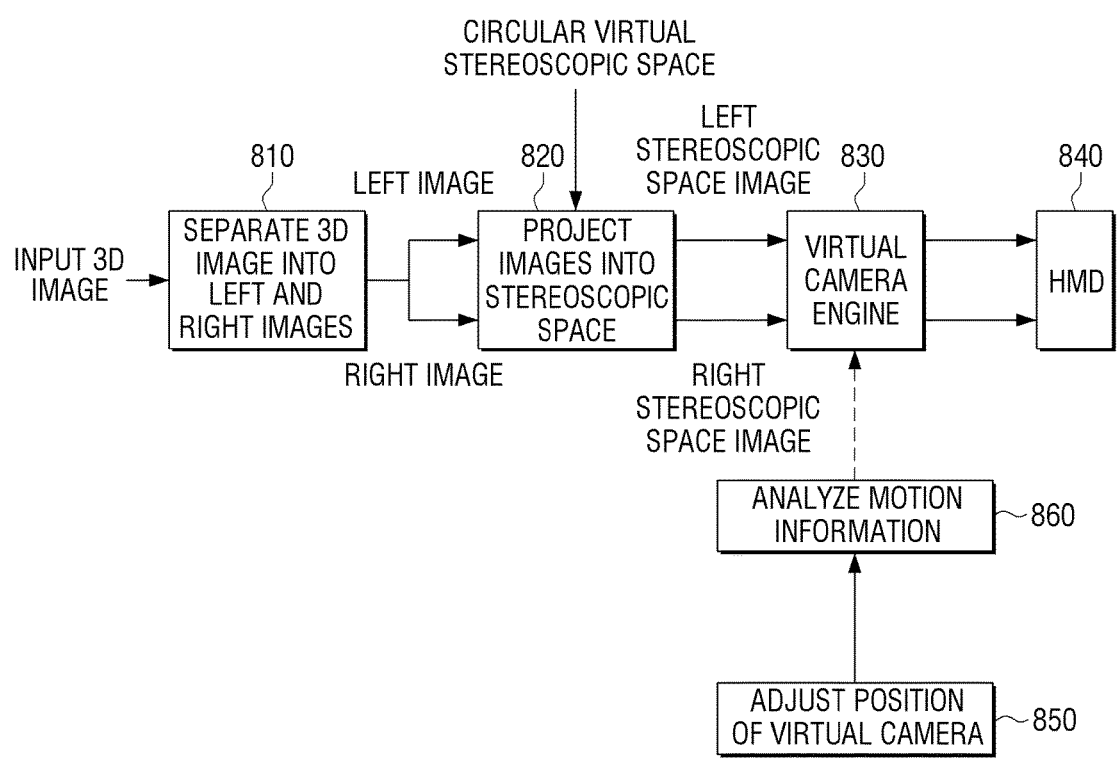
FIG. 8 is a view for describing a method for generating and outputting panorama virtual reality (VR) contents according to an exemplary embodiment of the present disclosure.

FIG. 8 is a view for describing a method for generating and outputting panorama VR contents according to an exemplary embodiment of the present disclosure.

As illustrated in FIG. 8, the master device 100 separates a 3D image into left and right images (810) when the 3D image is input from an external source, and then projects the left and right images into a virtual stereoscopic circular space to provide a left-eye stereoscopic image and a right-eye stereoscopic image (820). In this case, the provided stereoscopic image may be a panorama VR image, and the master device 100 may provide the panorama VR image using various VR methods such as existing three-dimension based avatar, object, scene, actual image based panorama VRs, photo object VR, and the like.

However, in the case in which stereo images in which a left-eye image and a right-eye image are separated from each other are received, the master device 100 may use the corresponding left and right images as they are, or provide and use a 3D image may be provided on the basis of a 2D image depending on a 2D-3D conversion method, but a detailed description therefor will be omitted.

Then, the master device 100 may select desired viewpoint images through a virtual camera engine and output the selected viewpoint images, respectively, as the left and right images (840) to provide a 3D VR image.

Meanwhile, in the case in which a motion is changed, the master device 100 may analyze motion information (850), adjust a direction of a virtual camera on the basis of the analyzed motion information (860), and obtain left and right images of a viewpoint region corresponding to the corresponding motion information through the virtual camera engine 830 and then output the obtained left and right images (840). That is, in the case in which it is assumed that the virtual camera exists in a circular stereoscopic space, the master device 100 may adjust the direction of the virtual camera to a direction corresponding to the motion of the master device 100, obtain an image captured by the virtual camera of which the direction is adjusted in an image mapped into the circular stereoscopic space, and output the obtained image.

In addition, in the case in which the master device 100 streams an image to the slave device 200, the master device may adjust the direction of the virtual camera on the basis of the motion information received from the slave device 200 (860), and obtain left and right images of a viewpoint region corresponding to the corresponding motion information through the virtual camera engine 830, and transmit the obtained left and right images to the slave device 200.

Then, the master device 100 may select the desired viewpoint images through the virtual camera engine and provide the selected viewpoint images, respectively, as the left and right images to provide the 3D VR image.

Meanwhile, when the slave device 200 receives the 3D image corresponding to the motion information from the master device 100, the slave device 200 may process the received 3D image in the same manner as that of the master device 100 and provide the processed 3D image.

Figure 9:
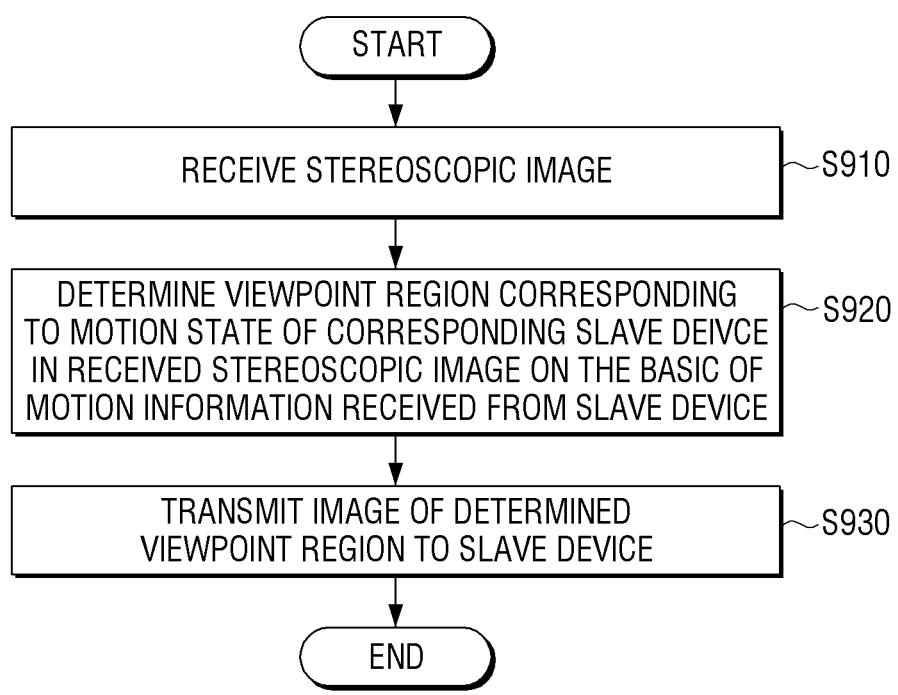
FIG. 9 is a flow chart for describing a control method for a master device according to an exemplary embodiment of the present disclosure.

FIG. 9 is a flow chart for describing a control method for a master device according to an exemplary embodiment of the present disclosure.

According to the control method for a master device providing an image to a slave device providing a virtual reality service according to an exemplary embodiment of the present disclosure, when a stereoscopic image is first input (S910), the viewpoint region corresponding to the motion state of the corresponding slave device in the input image is identified on the basis of the motion information received from the slave device (S920). Then, the image of the identified viewpoint region is transmitted to the slave device (S930).

In addition, the control method for a master device may further include projecting the left-eye image and the right-eye image included in the input stereoscopic image into the virtual stereoscopic space to provide the left-eye stereoscopic space image and the right-eye stereoscopic space image and obtaining the viewpoint region corresponding to the motion state of the slave device in the provided left-eye stereoscopic space image and right-eye stereoscopic space image.

In addition, in S930 in which the image of the identified viewpoint region is transmitted to the slave device, one region of the image buffer may be secured as the transmission buffer on the basis of the device display information received from the slave device, and the image corresponding to the motion information of the slave device may be buffered in the transmission buffer and be then transmitted to the corresponding slave device.

In addition, the control method for a master device may further include sensing the motion state of the master device, wherein in S920 in which the viewpoint region is identified, the motion information received from the slave device may be calibrated based on the sensed motion state to provide the relative motion information corresponding to the slave device and the viewpoint region corresponding to the motion state of the slave device may be identified on the basis of the provided relative motion information.

In addition, the control method for a master device may further include predicting the future motion information of the slave device on the basis of the currently received motion information of the slave device and transmitting the image of the viewpoint region corresponding to the future motion state of the slave device in the input stereoscopic image to the slave device on the basis of the predicted motion information.

In addition, in S930 in which the image of the identified viewpoint region is transmitted to the slave device, the plurality of slave devices may be grouped into one group in the case in which the motion information received from the plurality of slave devices belongs to the predetermined threshold range, and the image of the same viewpoint region may be transmitted to the plurality of slave devices belonging to the same group.

FIG. 10 is a flow chart for describing a control method for a slave device according to an exemplary embodiment of the present disclosure.

According to the control method for a slave device providing a virtual reality service according to an exemplary embodiment of the present disclosure illustrated in FIG. 10, the motion state of the slave device is first sensed (S1010).

Then, the information on the sensed motion state is transmitted to the master device providing the virtual reality service on the basis of the input stereoscopic image (S1020).

Then, the image of the viewpoint region corresponding to the sensed motion state is received from the master device and is then output (S1030).

In addition, in S1020 in which the information on the sensed motion state is transmitted to the master device, when the motion information of the master device is received from the master device, the sensed motion state may be calibrated based on the received motion information to provide the relative motion information corresponding to the slave device, and the provided relative motion information may be transmitted to the master device.

In addition, the control method for a slave device may further include outputting the image of the viewpoint region identified on the basis of the real time motion state in the received image when the image of the viewpoint region corresponding to the future motion state predicted on the basis of the motion information transmitted from the master device is received.

As described above, according to the diverse exemplary embodiments of the present disclosure, a plurality of users may receive appropriate images capable of providing optimal immersion, respectively, while sharing one content with one another.

Meanwhile, the methods according to the diverse exemplary embodiments described above may be programmed and stored in various storage media. Therefore, the methods according to the diverse exemplary embodiments described above may be implemented in various types of electronic apparatuses executing the storage media.

In detail, according to an exemplary embodiment of the present disclosure, a non-transitory computer readable medium in which a program sequentially performing determining the viewpoint region corresponding to the motion state of the corresponding slave device in the input image on the basis of the motion information received from the slave device and obtaining the image of the identified viewpoint region from the input image is stored may be provided.

The non-transitory computer readable medium is not a medium that stores data therein for a while, such as a register, a cache, a memory, or the like, but means a medium that semi-permanently stores data therein and is readable by a device. In detail, various applications or programs described above may be stored and provided in the non-transitory computer readable medium such as a compact disk (CD), a digital versatile disk (DVD), a hard disk, a Blu-ray disk, a universal serial bus (USB), a memory card, a read only memory (ROM), or the like.

In addition, although the exemplary embodiments of the present disclosure have been illustrated and described hereinabove, the present disclosure is not limited to the above-mentioned specific exemplary embodiments, but may be variously modified by those skilled in the art to which the present disclosure pertains without departing from the scope and spirit of the present disclosure as disclosed in the accompanying claims. These modifications should also be understood to fall within the scope of the present disclosure.

The invention claimed is:

1. A master device providing an image to a slave device providing a virtual reality service, the master device comprising:
   a content input receiver;
   a communicator; and
   a processor configured to:
      identify a viewpoint region corresponding to a motion state of the slave device in an input stereoscopic image received by the content input receiver based on motion information received from the slave device, and
      control the communicator to transmit an image of the viewpoint region to the slave device,
   wherein the processor is further configured to obtain the viewpoint region in a left-eye stereoscopic space image and a right-eye stereoscopic space image obtained by projecting a left-eye image and a right-eye image included in the input stereoscopic image into a virtual stereoscopic space.

2. The master device as claimed in claim 1, wherein the processor is further configured to:
   secure one region of an image buffer as a transmission buffer based on device display information received from the slave device,
   buffer an image corresponding to the motion information of the slave device in the transmission buffer, and transmit the buffered image to the slave device.

3. The master device as claimed in claim 1, further comprising a sensor configured to sense a motion state of the master device,
   wherein the processor is further configured to:
      calibrate the motion information received from the slave device based on the motion state of the master device to provide relative motion information corresponding to the slave device, and
      identify the viewpoint region corresponding to the motion state of the slave device based on the relative motion information.

4. The master device as claimed in claim 1, wherein the processor is further configured to:
   predict future motion information of the slave device based on currently received motion information of the slave device, and
   transmit an image of a viewpoint region corresponding to a future motion state of the slave device in the input stereoscopic image to the slave device based on the future motion information.

5. The master device as claimed in claim 1, wherein the slave device is one of a plurality of slave devices, and
   the processor is further configured to:
      group the plurality of slave devices into groups based on the motion information received from the plurality of slave devices being within threshold range, and
      transmit an image of a same viewpoint region to the plurality of slave devices belonging to a same group among the groups.

6. A slave device providing a virtual reality service, the slave device comprising:
   a communicator configured to perform communication with a master device providing the virtual reality service based on an input stereoscopic image;
   a sensor configured to sense a motion state of the slave device; and
   a processor configured to control the communicator to transmit information on the motion state to a master device, and receive an image of a viewpoint region corresponding to the motion state from the master device, and output the received image,
   wherein, when an image of a viewpoint region corresponding to a future motion state predicted based on the transmitted information is received from the master device, the processor is further configured to output an image of the viewpoint region identified based on a real time motion state.

7. The slave device as claimed in claim 6, wherein, when motion information of the master device is received from the master device, the processor is further configured to:
   calibrate the motion state based on the motion information of the master device, to provide relative motion information corresponding to the slave device, and
   transmit the relative motion information to the master device.

8. The slave device as claimed in claim 6, wherein the processor is further configured to:
   transmit device information of the slave device together with the information on the motion state to the master device, and
   receive the image of the viewpoint region corresponding to the motion state from the master device based on the device information.

9. An image system providing a virtual reality service, the image system comprising:
   a slave device configured to sense a motion state and transmit motion information on the motion state; and
   a master device configured to identify a viewpoint region corresponding to the motion state of the slave device in an input stereoscopic image based on the motion information received from the slave device, and transmit an image of the viewpoint region to the slave device,
   wherein the master device is further configured to obtain the viewpoint region in a left-eye stereoscopic space image and a right-eye stereoscopic space image obtained by projecting a left-eye image and a right-eye image included in the input stereoscopic image into a virtual stereoscopic space.

10. A control method for a master device providing an image to a slave device providing a virtual reality service, the control method comprising:
  receiving an input stereoscopic image;
  identifying a viewpoint region corresponding to a motion state of the slave device in the input stereoscopic image based on motion information received from the slave device; and
  transmitting an image of the viewpoint region to the slave device,
  wherein the identifying the viewpoint region comprises obtaining the viewpoint region in a left-eye stereoscopic space image and a right-eye stereoscopic space image obtained by projecting a left-eye image and a right-eye image included in the input stereoscopic image into a virtual stereoscopic space.

11. The control method as claimed in claim 10, wherein, in the transmitting the image of the viewpoint region to the slave device, one region of an image buffer is secured as a transmission buffer based on device display information received from the slave device, and an image corresponding to the motion information of the slave device is buffered in the transmission buffer and is then transmitted to the slave device.

12. The control method as claimed in claim 10, further comprising sensing a motion state of the master device,
  wherein, in the identifying the viewpoint region, the motion information received from the slave device is calibrated based on the motion state of the master device to provide relative motion information corresponding to the slave device, and the viewpoint region corresponding to the motion state of the slave device is identified based on the relative motion information.

* * * * *